(12) United States Patent
Gschwind

(10) Patent No.: US 6,502,504 B1
(45) Date of Patent: Jan. 7, 2003

(54) DEVICE FOR PREPARING FOOD

(76) Inventor: Ernst Gschwind, Gundersdorf 34, 8511 St. Stefan (AT)

( * ) Notice: Subject to any disclaimer, the term of this patent is extended or adjusted under 35 U.S.C. 154(b) by 0 days.

(21) Appl. No.: 09/763,800

(22) PCT Filed: Aug. 27, 1999

(86) PCT No.: PCT/AT99/00209

§ 371 (c)(1), (2), (4) Date: Mar. 20, 2001

(87) PCT Pub. No.: WO00/11995

PCT Pub. Date: Mar. 9, 2000

(30) Foreign Application Priority Data

Aug. 28, 1998 (AT) .............................. 1469/98
Aug. 28, 1998 (AT) .............................. 1470/98

(51) Int. Cl.[7] .............................. A47J 37/06; A47J 37/07
(52) U.S. Cl. .............................. 99/446; 99/444; 99/400; 99/401; 99/447
(58) Field of Search ............... 99/446, 444, 400, 99/447, 401

(56) References Cited

U.S. PATENT DOCUMENTS 4,574,770 A * 3/1986 Wells ................... 126/25 R
4,606,261 A * 8/1986 Bernardi ................. 99/445

FOREIGN PATENT DOCUMENTS

| DE | 25 29 409 A | 1/1977 |
| FR | 2 554 560 A | 5/1985 |
| WO | WO 95 30365 A | 11/1995 |

* cited by examiner

*Primary Examiner*—Reginald L. Alexander
(74) *Attorney, Agent, or Firm*—Henry M. Feiereisen (57) ABSTRACT

The invention relates to a device for preparing food, such as a grilling or baking device, comprising a unit for heating air (5) and possibly a rack. Above the unit for heating air (5) several run-off grooves (11) for the juices of the food being prepared are arranged at a distance from each other and preferably in the same plane. Between the device for heating the air (5) and the run-off grooves (11) at least one device (28) is positioned for deflecting the heated air which rises from the air-heating device in the direction of the run-off grooves.

37 Claims, 4 Drawing Sheets

DEVICE FOR PREPARING FOOD

BACKGROUND OF THE INVENTION

The invention relates to an apparatus for preparing food, such as a grilling or baking device, comprising a device for heating the air and optionally a grill. Above the unit for heating air, hollow profiles are arranged which can be flowed through by a coolant and whose upper sides are provided with a groove-like arrangement and form run-off grooves for the juices of the food being prepared.

In previously known apparatuses of this kind, the coolant flowing through the hollow profiles, which helps avoid any overheating and the resulting charring of the juices of the food, is either not moved, as a result of which only a low cooling effect is obtained, or there is a forced movement by the hollow profiles which depends on an external energy source such as a battery-operated coolant pump. The latter leads to the consequence that the preparing apparatus will only function correctly when suitable batteries or at least a mains connection are available. Moreover, the installation of a coolant pump leads to additional efforts in production and maintenance.

SUMMARY OF THE INVENTION

It is therefore an object of the present invention to provide an apparatus of the kind mentioned above in which a forced movement of the coolant can be realized without any external energy source.

This is achieved in accordance with the invention in that the hollow space within the hollow profiles are formed by at least one, preferably two, chamber(s) which extend continuously in the longitudinal direction of the hollow profiles, whereby the chamber(s) are or can be flowed through by a coolant by means of at least one apparatus to form a coolant flow by using a pressure difference produced in the preparing apparatus.

In this way one or several chambers of the hollow profiles can be flowed through by the coolant without requiring any dependence on any external energy source. The production and maintenance of an apparatus in accordance with the invention is also simplified by the fact that a coolant moving apparatus which is operated by an external energy source can be omitted. The apparatus for forming the coolant flow produces a coolant movement by way of a pressure difference which is produced for example as a result of combustion, a difference in height, difference in density or the like, so that the energies converted in the preparing apparatus for heating for example are used not only for heating the food to be prepared.

A particularly advantageous embodiment of the invention provides that the coolant is a gas, preferably air. As a result, the air sucked in from the ambient environment can be used as a coolant.

A particularly efficient apparatus for forming a coolant flow can be achieved according to a variant of the invention by a suction draft apparatus which allows a relatively strong coolant movement.

It may be provided for in a further embodiment of the invention that the suction draft apparatus is formed by a suction opening of the heating device, that the chamber, or one thereof, of the hollow profiles is in connection at a face-side end with the suction opening via a connecting conduit, and that the opposite other face side of the chamber (s) is open.

Every heating device produces an air movement by the heat emitted by the same. Particularly the suction draft produced during combustion, produces an air flow towards the source of combustion. This suction effect produced during the combustion can therefore also be used for the suction draft effect through the hollow profiles. Moreover, during the supply of a gaseous fuel, the negative pressure produced around the fuel flow can be applied to the coolant movement.

It may be provided in a further embodiment of the invention that the heating device consists of several, preferably rod-shaped gas burners whose gas supply lines extend through the associated connecting conduits, with the air suction opening being disposed within the connecting conduit in the gas supply line.

The gas burners allow a planar heating of the food to be prepared without producing any disturbing combustion exhaust gases.

The gas burner can be provided with gas outlet nozzles which are spaced from one another along the length of the burner, so that gas combustion is obtained which is evenly distributed over the length of the gas burner and an even heating of the food to be prepared is achieved.

In order to prevent any dripping of juices from the food to be prepared onto the gas burner, it can be provided in accordance with a further embodiment of the invention that the rod-shaped gas burners extend parallel to the hollow profiles.

It can be provided according to a further variant of the invention that the suction draft apparatus is formed by an upwardly extending (in the used position) chimney-like flue conduit, that the chambers, or one thereof, of the hollow profiles are connected with the flue conduit at their face-sided end, which flue conduit is open at its upper end, and that the opposite other face-sided end of the chamber(s) is open.

In this way it is possible to use the difference in height between the air inlet position at the hollow profile ends and the upper end of the flue conduit in order to produce a respective suction draft effect on the air flowing through the hollow profiles.

In order to provide a further increase in the flue draft it may be provided according to a further embodiment of the invention that the chimney-like flue conduit is provided with laterally provided air inlet slots. In this way, the warm air of low density which rises from the heating device can enter the flue conduit and reinforce the suction draft acting on the air flowing through the hollow profile chambers.

A preferable further development of the invention provides that the chimney-like flue conduit is provided with a rectangular cross section.

A particularly even distribution of the warm air rising from the heating device can be achieved according to a further variant of the invention in such a way that the hollow profiles, as seen in the used position, are arranged horizontally and the run-off grooves are arranged inclined against the horizontal.

In can be provided for in a further embodiment of the invention that the chamber(s) is or are additionally connected with an apparatus for forced cooling, e.g. an air fan, a coolant pump, or the like. A forced cooling can be achieved in addition to the coolant flow produced by the pressure difference, which forced cooling can be activated in the case of insufficient cooling performance.

Hollow profiles which are easy to produce in a constructional sense and are used to connect with the suction draft apparatus can be achieved in such a way that the two chambers are provided with a superimposed arrangement.

According to a further variant of the invention it can be provided that the heating device is formed by a combustion chamber for filling with charcoal and the suction opening by an air supply opening for the primary air supply into the combustion chamber for the combustion of the charcoal.

The air sucked in from the outside during the combustion of the charcoal flows first through the hollow profiles and thus achieves a measurable reduction in the temperature of the food to be prepared.

The invention relates further to an apparatus for preparing food such as a grilling or baking device, comprising a device for heating air and optionally a grill. Above the device for heating the air several run-off grooves for the juices of the food being prepared are arranged at a distance from one another and preferably in one plane.

Run-off grooves for devices such as grills and baking ovens have long been used to collect the juices of food being prepared and to discharge the same so as to prevent them from reaching the heating device and burning there, as otherwise the vapors produced during the combustion could contaminate the food being prepared with carcinogenic substances.

The run-off grooves are located directly above the heating device and therefore require additional cooling since the juices running off on the grooves could otherwise be overheated and would thus contribute to the production of amounts of carcinogenic substance.

Most of the known cooling apparatuses which are used for this purpose are provided with a very complex arrangement and require a forced movement of the coolant.

It is therefore the object of the present invention to provide an apparatus of the kind mentioned above with which in a technically simple way it is possible to avoid any overheating of the food juices dripping onto the run-off grooves.

This is achieved in accordance with the invention in such a way that between the device for heating the air and the run-off grooves at least one apparatus for deflecting the heated air rising from the device for heating in the direction of the run-off grooves.

As a result, the portions of the rising heated air which would otherwise come directly into heat contact with the run-off grooves and would heat the same are conducted away from the run-off grooves and between the same. As a result of the deflection of the heat flow it is possible to omit any direct cooling of the run-off grooves, or at least any overtemperatures that might occur on the run-off grooves will be so low that the same can be reduced with very simple cooling measures. Moreover, it is possible to prevent with the horizontal arrangement of the deflection apparatus with an inclined arrangement of the hollow profiles that the rising heated air is conducted upwardly along the hollow profiles and that as a result a much stronger heating occurs at the highest position of the hollow profiles than at the positions of the inclined hollow profiles which are beneath the same. An averaging of the temperature progress is thus achieved, so that the food being prepared is not heated with differing intensities.

It can be provided for in a further embodiment of the invention that the apparatus for deflecting the heated air is formed by profiled sheet metal extending parallel to the longitudinal direction of the run-off grooves and beneath the same.

The profiled sheets are thus arranged directly between the heating device and the run-off grooves and deflect the rising hot air away from the lower side of the run-off grooves, so that the same can progress on its way to the food being prepared between the mutually spaced run-off grooves.

It can be provided for in accordance with a further embodiment of the invention that the profiled sheets are arranged, as seen in a cross-sectional view, in the shape of a semi-ellipse divided along its main axis, with the concave portion of the semi-ellipse facing the run-off grooves.

The profile sheet thus provided with a streamlined arrangement allows a highly efficient deflection of the heated air rising from the heating device.

In order to achieve the most comprehensive deflection of the rising heated air, the profiled sheets can extend, as seen in a cross-sectional view, at least over the entire width of the run-off grooves.

As has already been mentioned above, the deflection apparatus allows keeping the rising heated air at least partially away from the run-off grooves and thus achieving a measurable reduction of the groove temperature. In order to achieve an additional cooling it can be provided according to a further embodiment of the invention that hollow profiles which can be flowed through by a coolant such as air or water are arranged on the lower side of the run-off grooves. The coolant that can be conducted through the hollow profiles ensures that a relatively low run-off groove temperature can be maintained, even during any operation of the preparation apparatus in accordance with the invention over prolonged periods of time.

In a particularly advantageous embodiment of the invention it can be provided that the hollow profiles each consist of a basic profile made of floor walls which are arranged V-shaped (as seen in a cross-sectional view) and laterally adjoining vertical walls, and that the run-off grooves having a V-shaped cross section are placed on the vertical walls of the basic profile.

When the hollow profiles are formed according to a further embodiment of the invention of a heat insulating material, a further reduction of the temperature prevailing on the run-off groove is achieved.

In a further embodiment of the invention the heat insulating material can be formed of a ceramic fiber material which is provided with a particularly low thermal conductivity.

To prevent any particles from the rough or fibrous surface of the hollow profiles from reaching the food being prepared, the hollow profiles can be completely encased, with the encasing preferably being formed at least partially by a metal or metal alloy, enamel, glass or a glass mixture, or any temperature-resistant plastic such as teflon or the like.

In order to achieve an effective coolant movement, the hollow profile with the inserted run-off grooves can be in connection at one face-sided end via a connecting conduit with an apparatus for forming a coolant flow by utilizing a pressure difference produced in the preparation apparatus, preferably a suction draft apparatus, and the opposite other face-sided end can be open.

External energy sources for the coolant movement can be omitted as a result of the apparatus used thereby for forming a coolant flow.

It can be provided in accordance with a further embodiment of the invention that the heating device is formed by several, preferably rod-shaped, gas burners whose gas supply lines extend through the associated connecting conduits, with an air-suction opening being provided within the connecting conduit forming the suction draft apparatus in the gas supply line.

The gas flowing into the heating device sucks in air by way of the air-suction opening of the gas supply line and thereby produces an air stream which is conducted through the hollow profiles and causes a cooling of the same there.

In a further embodiment of the invention the gas burners can be provided with gas outlet nozzles which are mutually spaced from one another over its length, thus ensuring a very even emission of gas over the entire length of the gas burner.

A particularly preferable distribution of heat can be achieved with the gas burners in the case when the rod-shaped gas burners extend parallel to the hollow profiles and run-off grooves in accordance with a further embodiment of the invention.

A further variant of the invention can be that the heating device is formed by a combustion chamber for filling with charcoal and the apparatus for providing the coolant flow is formed by an air supply opening into the combustion chamber. The air sucked in from the outside during the combustion of the charcoal first flows through the hollow profiles and achieves in this process a measurable reduction of the temperature of the food being prepared.

For the purpose of a simpler production of the hollow profiles the hollow profiles can be arranged in two parts in accordance with a further embodiment of the invention.

It can be provided according to a further embodiment of the invention that the hollow profiles are each formed by a basic profile consisting of, as seen in a cross-sectional view, two mutually spaced traverses having a V-shaped cross section and two laterally adjoining vertical walls, as well as a run-off groove having a V-shaped cross section which is placed on the walls of the basic profile.

In this way the hollow profiles which are subdivided in the manner of chambers can be produced in a simple way. The run-off groove can be made of a different material, so that the same especially enables a favorable heat contact between the cooling air and the juices of the food being prepared.

In order to prevent the hot air rising from the heating device from overheating the hollow profiles, the hollow profiles can be made of a heat insulating material.

In a further embodiment of the invention the heat insulating material can be formed of a ceramic fiber material which is provided with a particularly low thermal conductivity.

To prevent any particles from the rough or fibrous surface of the hollow profiles from reaching the food being prepared, the hollow profiles can be completely encased, with the encasing preferably being formed at least partially by a metal or metal alloy, enamel, glass or a glass mixture, or any temperature-resistant plastic such as teflon or the like.

In order to achieve an effective coolant movement, the hollow profiles with the inserted run-off grooves can be in connection at one face-sided end via a connecting conduit with an apparatus for forming a coolant flow by utilizing a pressure difference produced in the preparation apparatus, preferably a suction draft apparatus, and the opposite other face-sided end can be open.

BRIEF DESCRIPTION OF THE DRAWING

The invention is now explained in closer detail by reference to the embodiment shown in the drawings, wherein.

DETAILED DESCRIPTION OF THE PREFERRED EMBODIMENTS

Figure 1:
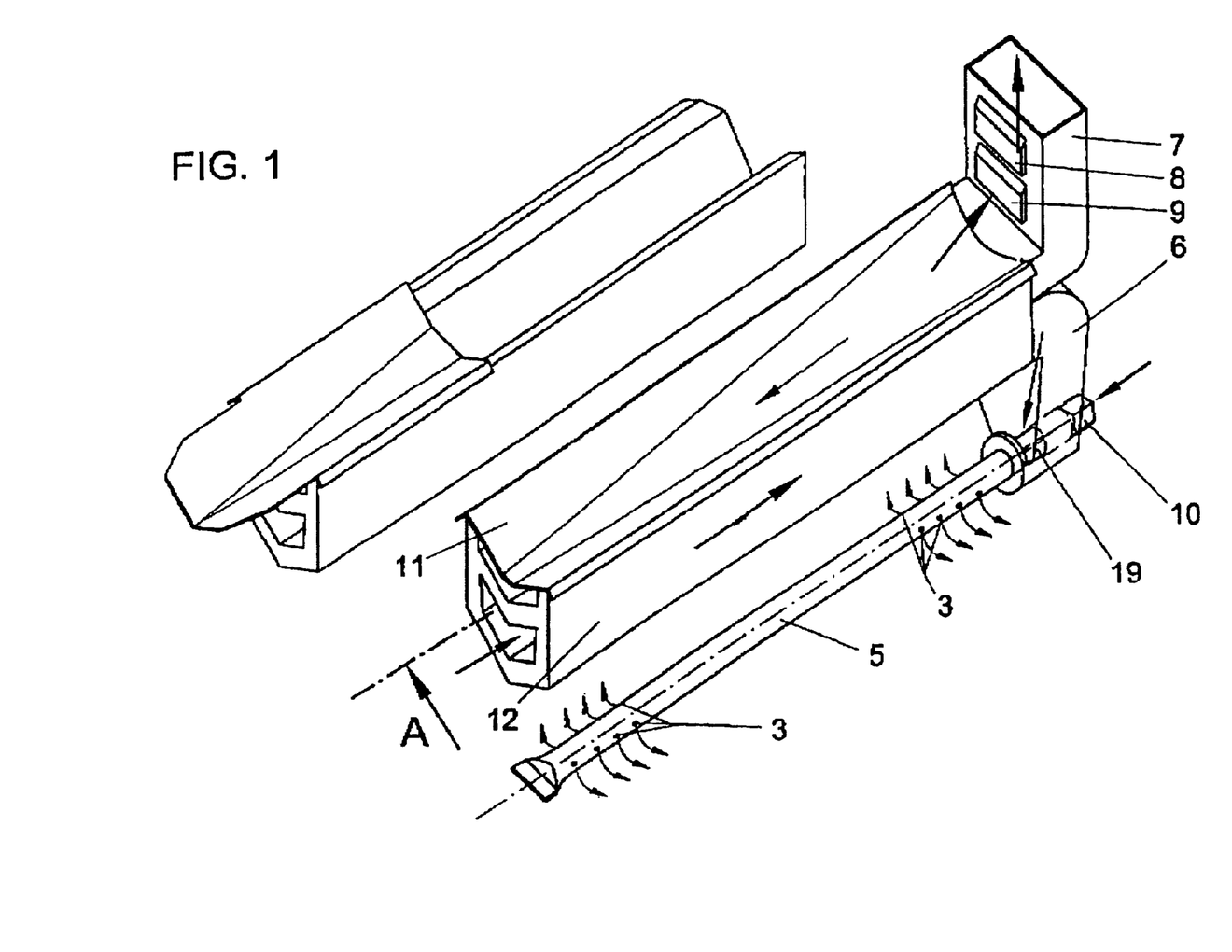
FIG. 1 shows an embodiment of the apparatus in accordance with the invention in an oblique view.

FIG. 1 shows the parts of an apparatus for preparing food such as a grilling or baking device in an oblique view, comprising a device for heating air 5 which is formed in this embodiment by several rod-shaped gas burners 5, of which one is shown in FIG. 1.

The device for heating the air can also be suitable for burning solid fuels. A grill can be provided on which charcoal can be burnt.

Hollow profiles or section members 11, 12 are arranged above the device for heating the air, which hollow profiles are flowed through by a coolant and whose upper sides are provided with a groove-like arrangement and thus form run-off grooves 11 for the juices of the food being prepared.

The hollow profiles are arranged horizontally as seen in the position of use, and the run-off grooves 11 are provided with an arrangement inclined against the horizontal. Draining edges are provided at the longitudinal sides of the run-off grooves which prevent any lateral dripping onto the air heating device.

The rod-shaped gas burners 5 are provided along their length with mutually spaced gas outlet nozzles 3 and extend parallel to the hollow profiles 12,11.

It is now provided in accordance with the invention that the hollow space within the hollow profiles 11, 12 is formed by at least one chamber, with there being two chambers 1, 2 in FIG. 1 which extend continuously in the longitudinal direction of the hollow profiles 11, 12. The chambers 1, (FIG. 2) can be flowed through by coolant by means of an apparatus to produce a coolant flow 7, 19 by using a pressure difference of coolant produced in the preparation apparatus. Said coolant flow apparatus is formed in the shown embodiment by two suction draft apparatuses 7, 19. It is also possible to use instead of said apparatuses a flow apparatus which is based on pressure instead of on suction draft.

Preferably, a gas, and air especially, can be used as coolant. It is also possible to use a liquid such as water for cooling the hollow profiles.

The food to be prepared on the apparatus in accordance with the invention produces juices during its heating which would drip onto the heating device and would produce carcinogenic substances there. For this purpose, V-shaped run-off grooves 11 are arranged on the hollow profiles 12 which collect the dripping juice and carry off the same in the longitudinal direction. To ensure that the hollow profiles per se are not heated to a temperature which would overheat the juices of the food being prepared, they can be flowed through by a coolant which reduces the hollow profile temperature to such an extent that the juices will not char.

Figure 2:
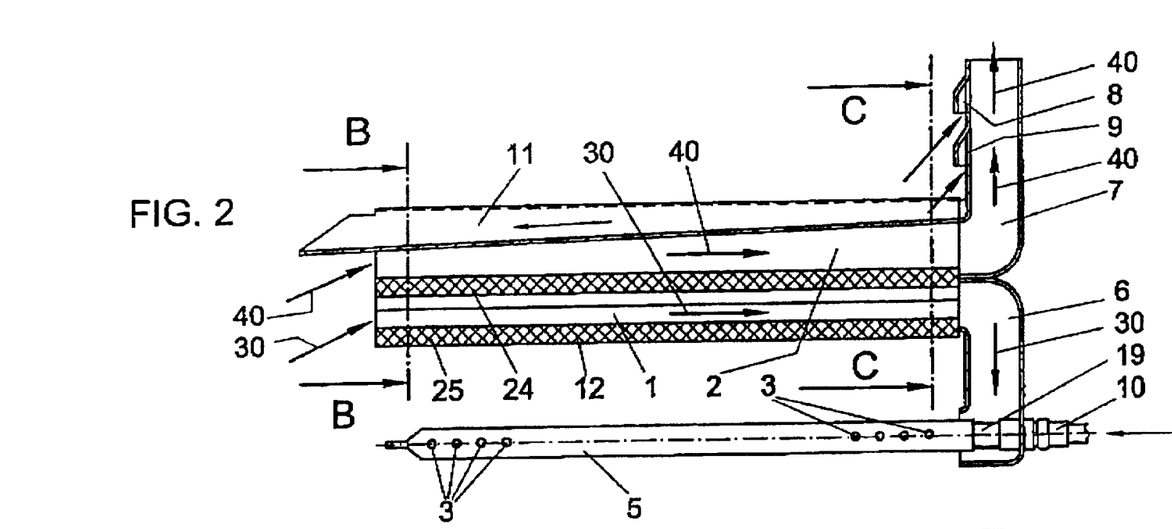
FIG. 2 shows a sectional view AA through the apparatus according to FIG. 1.

The cooling function of the two chambers 1, 2 is shown with particular clarity in FIG. 2. Chamber 1 which extends below chamber 2 is in connection at one face-sided end via a connecting conduit 6 with the suction draft apparatus which is arranged as a suction opening 19, with the other end of the chamber 1 which is opposite to the one end being provided with an open arrangement, so that air from the ambient environment can be sucked in through said open end. Chamber 1 is fully sufficient for a lower cooling effect, so that chamber 2 could also be omitted. The suction effect of the suction opening 19 is obtained from the gas stream which is conducted into the rod-shaped burner 5 via the gas supply line 10 which is guided through the connecting conduit 6. As a result of the negative pressure formed at the suction opening 19, an air stream indicated by arrows 30 is produced which mixes with the gas stream in the suction opening 19 which is arranged in the gas supply line 10 and thus provides the oxygen required for a favorable combustion. The air stream 30 simultaneously produces the cooling of the hollow profiles 11, 12, because air originating from the ambient environment is pulled through the lower chamber 1 and thus cools the hollow profiles 11, 12.

In order to further increase the cooling effect, a further chamber 2 is provided in the embodiment according to FIG. 1 through which the similarly cool ambient air can be conducted through the hollow profiles 11, 12. Chamber 2 can also be operated alone by omitting chamber 1.

The suction draft apparatus is formed (in the position of use) by a chimney-like, upwardly extending flue conduit 7 which is connected with chamber 2 at its face-sided end. The chamber 2 is open at its other opposite end. Said open end can be used to suck in cool ambient air through the chamber 2 of the hollow profile and be conducted through the same. The suction effect is produced from the pressure difference which is obtained by the chimney height. The higher the chimney-like conduit 7 extends upwardly, the stronger the intake of air.

In order to increase the suction effect, the chimney-like flue conduit 7 with a rectangular cross section is provided with laterally applied air inlet slots 8, 9 through which the hot air rising from the heating device reaches the flue conduit, which as a result of its low specific density also produces a suction effect on the air stream 40 arriving from chamber 2.

Chamber 2, or also both chambers 1, 2, can be additionally be connected with an apparatus for forced cooling (not shown) such as an air fan, a coolant pump, or the like. A forced cooling can be achieved in addition to the coolant flow produced by the pressure difference, which forced cooling can be activated in the case of inadequate cooling performance.

Instead of the gas burner it is also possible to use conventional charcoal burning or any similar burning for heating the food to be prepared. The heating device can consist of a combustion chamber for filling with charcoal and the suction opening by an air supply opening for the primary air supply into the combustion chamber for the combustion of the charcoal. Once the combustion process begins, air is sucked in by way of the air inlet opening which flows first through the hollow profiles and cools the same.

The embodiment according to FIGS. 1 through 4 shows two superimposed chambers 1, 2 which are arranged within the hollow profiles. As has already been mentioned above, there could also be only one or even several chambers of this kind.

Figure 3:
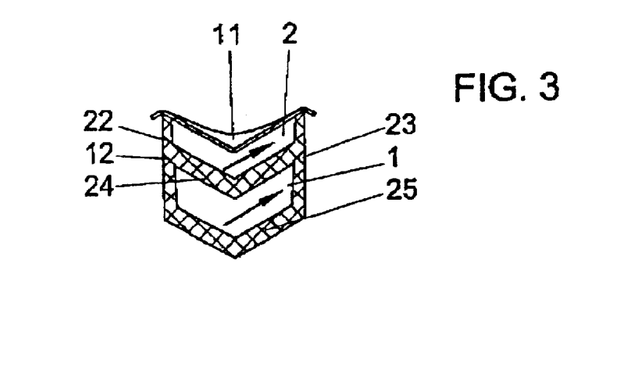
FIG. 3 shows a sectional view BB through the apparatus according to FIG. 1.
Figure 4:
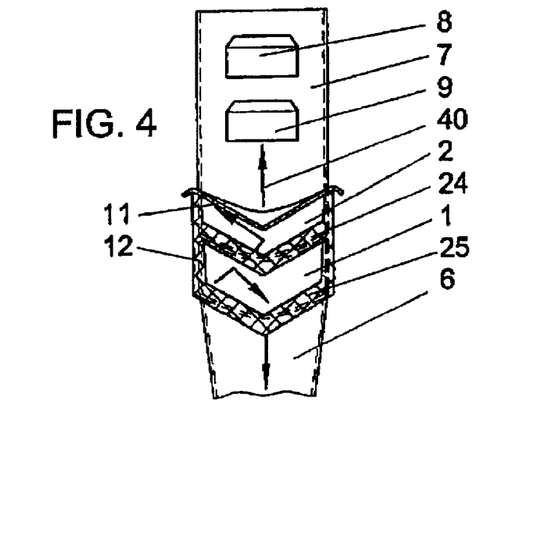
FIG. 4 shows a sectional view CC through the apparatus according to FIG. 1.

As is shown in FIG. 3, the hollow profiles 12, 11 are provided in an arrangement consisting of two parts.

The hollow profiles are each formed by a basic profile 12 consisting of, as seen in a cross-sectional view, two mutually spaced traverses 24, 25 having a V-shaped cross section and two laterally adjoining vertical walls 22, 23, as well as a run-off groove 11 having a V-shaped cross section which is placed on the walls 22, 23 of the basic profile 12. The run-off groove 11 covers the upper part of the basic profile in such a way that the upper chamber 2 is closed. The chambers 1, 2 can also be arranged in any other way. The hollow profiles 11, 12 can be formed from a heat insulating material, so that heat emitted by radiation or convection is held off from the interior of the hollow profiles 11, 12.

As a result, the high temperatures in the range of 400° C. to 650° C. which prevail on the lower side of the hollow profiles 12 cannot penetrate up to the run-off grooves 11, so that the juices of the food being prepared only come into contact with surfaces of a temperature of less than 120° C. and the charring thereof is prevented.

The heat insulating material is preferably formed by a ceramic fiber material which has a thermal conductivity for example in the range of 0.08 W/mK at 400° C. up to 0.23 W/mK at 1000° C. These values are fulfilled by a ceramic fiber material which can be obtained under the designation Form 612™ which contains high-temperature-resistant glass fibers containing $ZrO_2$, CaO, MgO, $SiO_2$, and $Al_2O_3$. It is also possible to use any other suitable heat insulating material to form the hollow profiles.

In order to line the rough surface of the heat insulating material to thus improve the hygienic conditions, a complete encasing of the hollow profiles can be provided which is formed, as required, by a metal or a metal alloy, an enamel layer or a glass or glass mixture. A further possibility for encasing the ceramic fiber material is to use temperature-stable plastic materials such as teflon or the like. The encasing contributes to the thermal conductivity and should therefore be chosen as thin as possible, e.g. some 100 µm.

Figure 5:
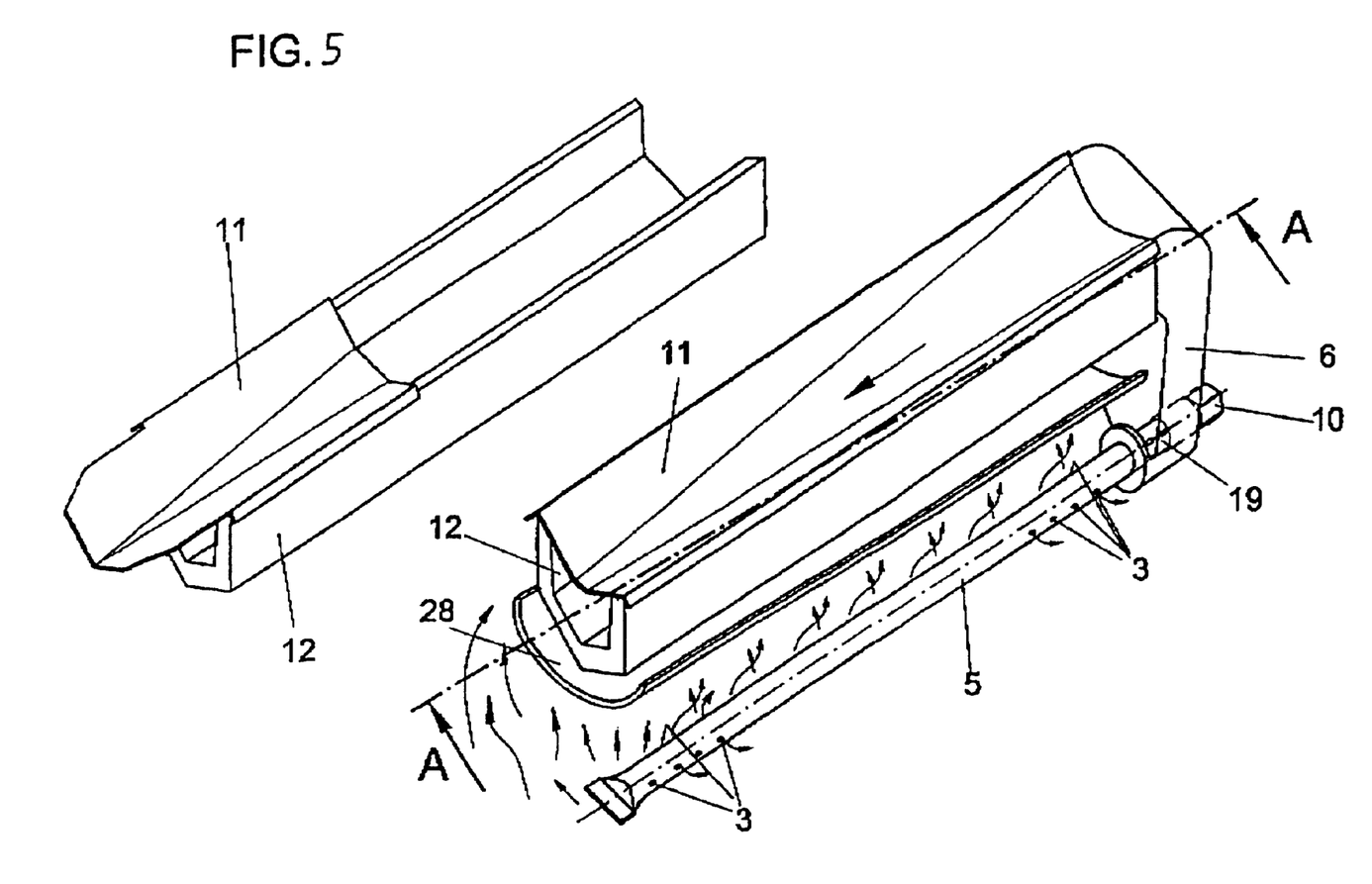
FIG. 5 shows a further embodiment of the apparatus in accordance with the invention in an oblique view.

FIG. 5 shows in an oblique view parts of a further embodiment of the apparatus in accordance with the invention for preparing food such as a grilling or baking device, comprising a device for heating air 5, which in this case is formed by several rod-shaped gas burners 5 of which one is shown in FIG. 5.

The device for heating the air can also be suitable for burning solid fuels. A grill can be provided on which charcoal can be burnt.

In accordance with the invention, an apparatus 28 for deflecting the air heated by the device 5 and rising in the direction towards the run-off grooves 11 is arranged between the device for heating the air 5 and the run-off grooves 11. The deflection of the air rising from the burners 5 can be performed in numerous ways and various different means, as are known to the man skilled in the art of flow techniques. The hot air must be prevented in any case from coming into contact with the run-off grooves 11 and heating the same to a temperature which could lead to the incineration or charring of the juices from the food being prepared.

The food to be prepared on the apparatus in accordance with the invention produces juices during its heating which would drip onto the heating device and would produce carcinogenic substances there. For this purpose, V-shaped run-off grooves 11 are arranged on the hollow profiles 12 which collect the dripping juice and carry off the same in the longitudinal direction. To ensure that the hollow profiles per se are not heated to a temperature which would overheat the juices of the food being prepared, they can be flowed through by a coolant which reduces the hollow profile temperature to such an extent that the juices will not char.

In addition to the deflection of the heated rising air, hollow profiles 12 which can be flowed through by a coolant are arranged on the lower side of the run-off grooves 11, which hollow profiles help prevent that the run-off grooves can become too hot during a longer period of operation of the apparatus in accordance with the invention. The rod-shaped gas burners 5 are provided with gas outlet nozzles 3 which are spaced from one another along the length thereof and extend parallel to the hollow profiles 12.

The reduction of the temperature shall occur to such an extent that the juices which drip onto the run-off groove will not char and produce carcinogenic particles which could then contaminate the food being prepared.

Preferably, a gas, and air especially, is used as coolant. It is also possible to use a liquid such as water to cool the hollow profiles.

Figures 6, 7:
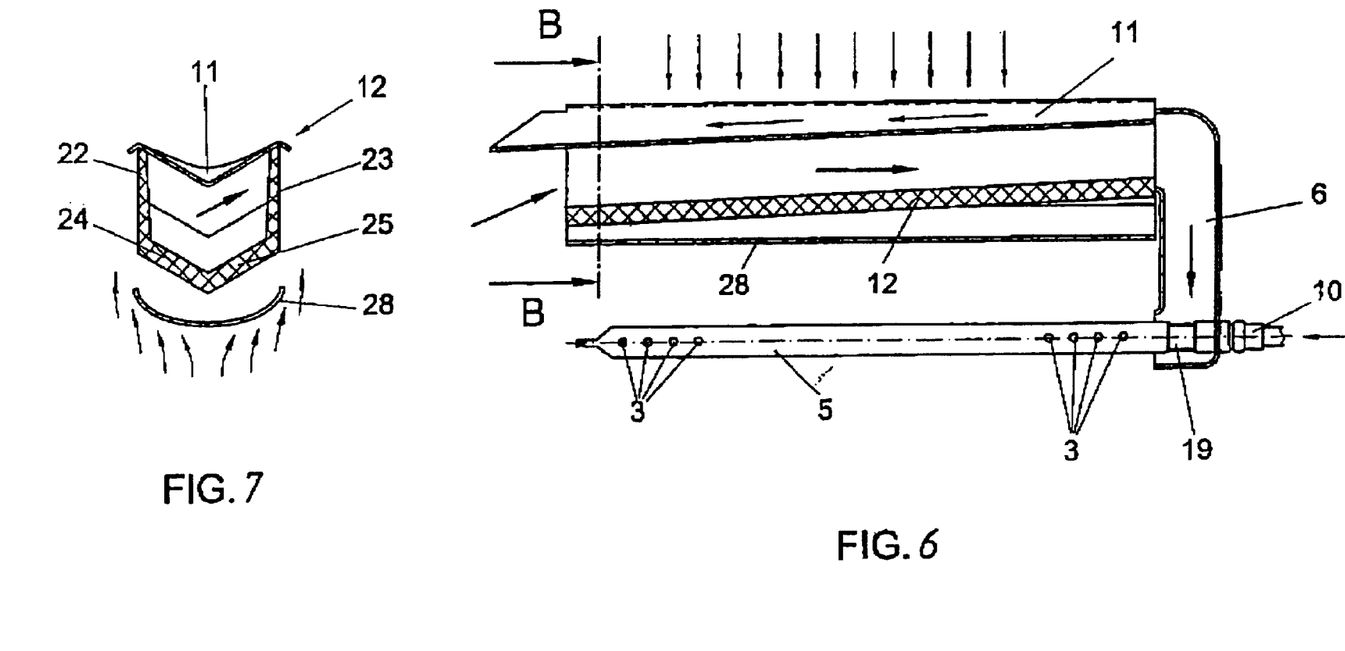
FIG. 6 shows a sectional view AA through the apparatus according to FIG. 5.
FIG. 7 shows a sectional view BB through the apparatus according to FIG. 5.

The apparatus for deflecting the heated air is formed pursuant to FIGS. 5 to 7 by profiled sheets 28 which extend parallel to the longitudinal direction of the run-off grooves beneath the same and which are preferably formed of a stainless steel. The profiled sheets 28 are arranged, as seen in a cross-sectional view, in the shape of a semi-ellipse divided along its main axis, with the concave portion of the semi-ellipse facing the run-off grooves 11 (FIG. 7).

The profiled sheets 28 extend, as seen in the cross-sectional view, over the entire width of the run-off grooves 11 and even extend beyond the same in order to effectively keep the rising air away from the run-off grooves 11.

The hollow profiles as shown in FIGS. 5 to 7 are each formed by a basic profile 12 consisting of, as seen in a cross-sectional view, two floor walls 24, 25 having a V-shaped cross section and two laterally adjoining vertical walls 22, 23, with the run-off grooves 11 having a V-shaped cross section being placed on the vertical walls 22, 23 of the basic profile 12.

The hollow profiles 12 are preferably formed of a heat insulating material, so that a further conduction of the heat emitted to the hollow profiles to the run-off grooves 11 will occur only to a marginal extent. As a result, the high temperatures in the range of 400° C. to 650° C. which prevail on the lower side of the hollow profiles 12 are kept off the run-off grooves 11, so that the juices of the food being prepared only come into contact with surfaces of a temperature of less than 120° C. and the charring thereof is prevented.

The heat insulating material is preferably formed by a ceramic fiber material which has a thermal conductivity for example in the range of 0.08 W/mK at 400° C. up to 0.23 W/mK at 1000° C. These values are fulfilled by a ceramic fiber material which can be obtained under the designation Form 612™ which contains high-temperature-resistant glass fibers containing $ZrO_2$, CaO, MgO, $SiO_2$, and $Al_2O_3$. It is also possible to use any other suitable heat insulating material to form the hollow profiles.

In order to line the rough surface of the heat insulating material to thus improve the hygienic conditions, a complete encasing of the hollow profiles can be provided which is formed, as required, by a metal or a metal alloy, an enamel layer or a glass or glass mixture. A further possibility for encasing the ceramic fiber material is to use temperature-stable plastic materials such as teflon or the like. The encasing contributes to the thermal conductivity and should therefore be chosen as thin as possible, e.g. some 100 μm.

As shown in particular in FIG. 6, the hollow profiles 12 are used for conducting air in order to allow an additional cooling of the run-off grooves 11.

For this purpose and according to the embodiment in accordance with FIGS. 1 to 4, the hollow profiles 12 are in connection with the inserted run-off grooves 11 at a face-sided end via one connecting conduit 6 each with the suction draft apparatus 19, whereas the respective other opposite face-sided end is open.

Instead of the gas burners it is also possible to use conventional charcoal combustion or any similar combustion to heat the food to be prepared. The heating device can be formed by a combustion chamber for filling with charcoal and the apparatus to form the coolant flow by an air supply opening into the combustion chamber.

What is claimed is:

1. Apparatus for preparing food, comprising:
a heater for heating air;
at least one hollow section member defining a longitudinal axis and arranged above the heater, wherein the hollow section member has an upper side, formed with a groove for providing a run-off for juices of a food being prepared, and includes at least one chamber extending continuously in a direction of the longitudinal axis; and
means interacting with the hollow section member for circulating a coolant through the chamber through exploitation of a pressure differential prevailing in the apparatus for preparing food, wherein the hollow section member has two of such chamber.

2. The apparatus of claim 1, wherein the coolant is a gas.

3. The apparatus of claim 2, wherein the coolant is air.

4. The apparatus of claim 1, wherein the means for circulating the coolant includes a suction draft unit.

5. The apparatus of claim 1, and further comprising a cooling means, connected to the chamber, for effecting a forced cooling action.

6. The apparatus of claim 5, wherein the cooling means is selected from the group consisting of air fan and a coolant pump.

7. The apparatus of claim 1, wherein the hollow section member is horizontal and the run-off is arranged at an inclination to the horizontal.

8. The apparatus of claim 1, wherein the two chambers are arranged in superimposed disposition.

9. Apparatus for preparing food, comprising:
a heater for heating air;
at least one hollow section member defining a longitudinal axis and arranged above the heater, wherein the hollow section member has an upper side, formed with a groove for providing a run-off for juices of a food being prepared, and includes at least one chamber extending continuously in a direction of the longitudinal axis; and
means interacting with the hollow section member for circulating a coolant through the chamber through exploitation of a pressure differential prevailing in the apparatus for preparing food, wherein the means for circulating the coolant includes a suction draft unit which includes a suction conduit connected to a suction opening of the heater, wherein the chamber has one end connected to the suction conduit and another end, which is open.

10. The apparatus of claim 9, wherein the heater includes at least one gas burner having a gas supply line extending through the suction conduit, wherein the suction opening of the heater is disposed in the gas supply line within the suction conduit.

11. The apparatus of claim 10, wherein the gas burner has a rod-shaped configuration.

12. The apparatus of claim 10, wherein the gas burner has an axial length and is provided with gas outlet nozzles in spaced-apart relationship along the axial length.

13. The apparatus of claim 10, wherein the gas burner extends in parallel relationship to the hollow section member.

14. The apparatus of claim 9, wherein the heater has a combustion chamber for filling with charcoal, wherein the suction opening is an air supply opening for primary air supply into the combustion chamber for combustion of the charcoal.

15. Apparatus for preparing food, comprising:

a heater for heating air;

at least one hollow section member defining a longitudinal axis and arranged above the heater, wherein the hollow section member has an upper side, formed with a groove for providing a run-off for juices of a food being prepared, and includes at least one chamber extending continuously in a direction of the longitudinal axis; and means interacting with the hollow section member for circulating a coolant through the chamber through exploitation of a pressure differential prevailing in the apparatus for preparing food, wherein the means for circulating the coolant includes a the suction draft unit which includes an upwardly extending chimney-like flue conduit, wherein the chamber has one end connected to the flue conduit and another end, which is open, wherein the flue conduit has an open upper end.

16. The apparatus of claim 15, wherein the flue conduit has lateral air inlet slots.

17. The apparatus of claim 15, wherein the flue conduit has a rectangular cross section.

18. Apparatus for preparing food, comprising:

a heater for heating air;

a run-off for draining juices of a food being prepared;

a baffle, arranged between the heater and the run-off, for deflecting heated air rising from the heater in the direction towards the run-off; and at least one hollow section member, positioned at a lower side of the run-off, for passage of a coolant.

19. The apparatus of claim 18, wherein a plurality of such run-off extends in a common plane.

20. The apparatus of claim 18, wherein the baffle is formed by a profiled sheet extending in parallel relationship to and beneath the run-off.

21. The apparatus of claim 20, wherein the profiled sheet is arranged, as seen in a cross-sectional view, in the shape of a semi-ellipse divided along its main axis and defining a concave portion facing the run-off.

22. The apparatus of claim 20, wherein the profiled sheet extends, as seen in a cross-sectional view, at least over an entire width of the run-off.

23. The apparatus of claim 18, wherein the coolant is one of air and water.

24. The apparatus of claim 18, wherein the hollow section member has a basic body having V-shaped bottom walls and lateral vertical walls interconnecting the bottom walls, wherein the run-off have a V-shaped cross section and are placed on the vertical walls of the basic body.

25. The apparatus of claim 18, wherein the hollow section member is formed by a heat insulating material.

26. The apparatus of claim 25, wherein the heat insulating material is made from a ceramic fiber material.

27. The apparatus of claim 18, and further comprising an enclosure for completely encasing the hollow section member, wherein the enclosure is made, at least partially, of a material selected from the group consisting of metal, metal alloy, enamel, glass, glass mixture, and any temperature-resistant plastic.

28. The apparatus of claim 27, wherein the enclosure is made of teflon.

29. The apparatus of claim 18, and further comprising means interacting with the hollow section member for circulating the coolant through the hollow section member through exploitation of a pressure differential prevailing in the apparatus for preparing food; and a suction conduit for connecting one end of the hollow section member to the means for circulating the coolant, wherein the hollow section member has another end which is open.

30. The apparatus of claim 29, wherein the means for circulating the coolant includes a suction draft unit.

31. The apparatus of claim 30, wherein the heater includes at least one gas burner having a gas supply line extending through the suction conduit and having a suction opening disposed in the suction conduit and defining the suction draft unit.

32. The apparatus of claim 31, wherein the gas burner has a rod-shaped configuration.

33. The apparatus of claim 31, wherein the gas burner has an axial length and is provided with gas outlet nozzles in spaced-apart relationship along the axial length.

34. The apparatus of claim 33, wherein the gas burner extends in parallel relationship to the hollow section member and the run-off.

35. The apparatus of claim 33, wherein the heater includes a combustion chamber for filling with charcoal and the means for circulating the coolant is formed by an air supply opening into the combustion chamber.

36. The apparatus of claim 18, wherein the hollow section member is made of two parts.

37. The apparatus of claim 36, wherein the hollow section member includes a basic body having two V-shaped traverses in spaced-apart disposition and two lateral vertical walls connected to the traverses, wherein the run-off has a V-shaped cross section and is placed on the walls of the basic body.

* * * * *